United States Patent
Chen (10) Patent No.: US 12,114,090 B2
(45) Date of Patent: Oct. 8, 2024

(54) DELTA VISION SENSOR

(71) Applicants: Beijing RuisiZhixin Technology Co., Ltd., Beijing (CN); Alpsentek GmbH, Zurich (CH)

(72) Inventor: Liming Chen, Wädenswil (CH)

(73) Assignees: BEIJING RUISIZHIXIN TECHNOLOGY CO., LTD., Beijing (CN); AlpsenTek, GmbH., Zurich (CH)

(*) Notice: Subject to any disclaimer, the term of this patent is extended or adjusted under 35 U.S.C. 154(b) by 107 days.

(21) Appl. No.: 17/606,251

(22) PCT Filed: Apr. 23, 2020

(86) PCT No.: PCT/EP2020/061391
§ 371 (c)(1),
(2) Date: Oct. 25, 2021

(87) PCT Pub. No.: WO2020/216867
PCT Pub. Date: Oct. 29, 2020

(65) Prior Publication Data
US 2022/0303490 A1   Sep. 22, 2022

(30) Foreign Application Priority Data
Apr. 25, 2019 (EP) .................... 19171222

(51) Int. Cl.
*H04N 25/771* (2023.01)
*H04N 25/75* (2023.01)
*H04N 25/778* (2023.01)

(52) U.S. Cl.
CPC .......... *H04N 25/771* (2023.01); *H04N 25/75* (2023.01); *H04N 25/778* (2023.01)

(58) Field of Classification Search
None
See application file for complete search history.

(56) References Cited

U.S. PATENT DOCUMENTS 5,705,807 A   1/1998   Throngnumchai et al.
7,728,269 B2  6/2010   Lichtsteiner et al.
(Continued)

FOREIGN PATENT DOCUMENTS

EP   2933995 A1   10/2015
EP   3313064 A1    4/2018
(Continued)

OTHER PUBLICATIONS

N. Tu et al., "CMOS active pixel sensor with combined linear and logarithmic mode operation", Proc. IEEE Canadian Conf. Electrical and Computer Engineering, 1998, pp. 754-757.
(Continued)

*Primary Examiner* — James M Hannett
(74) *Attorney, Agent, or Firm* — Simpson & Simpson, PLLC (57) ABSTRACT

An image sensor comprises an arrangement of pixels, the pixels including an acquisition circuit each, the acquisition circuit including: a sensor circuit configured to generate a sensor signal (VLOG) depending on a light signal illuminating a photosensor of the pixel; a storage circuit configured to store during a storage interval a stored signal (VSTORE) proportional to the sensor signal (VLOG); and a comparator circuit configured to generate after the refresh interval a comparator signal (VCOMP) depending on the sensor signal (VLOG) and the stored signal (VSTORE). A method of operating an image sensor comprises steps of generating a sensor signal (VLOG) depending on a light signal illuminating a photosensor of the pixel, storing during a storage interval a stored signal (VSTORE) proportional to the sensor signal (VLOG) and generating after the refresh interval a comparator signal (VCOMP) depending on the sensor signal (VLOG) and the stored signal (VSTORE).

24 Claims, 9 Drawing Sheets

(56) References Cited

U.S. PATENT DOCUMENTS

| | | | |
|---|---|---|---|
| 9,961,291 B2 | 5/2018 | Chen | |
| 10,218,922 B2 | 2/2019 | Kondo et al. | |
| 10,721,423 B2* | 7/2020 | Finateu | H04N 25/77 |
| 11,202,041 B2 | 12/2021 | Kindo | |
| 2010/0182468 A1 | 7/2010 | Posch et al. | |
| 2011/0169990 A1 | 7/2011 | Higuchi et al. | |
| 2011/0291019 A1 | 12/2011 | Yuan et al. | |
| 2013/0033613 A1 | 2/2013 | Gou et al. | |
| 2015/0035949 A1 | 2/2015 | Rouh et al. | |
| 2015/0358570 A1 | 12/2015 | Taniguchi | |
| 2016/0093273 A1 | 3/2016 | Wang et al. | |
| 2016/0094787 A1 | 3/2016 | Govil et al. | |
| 2016/0094800 A1 | 3/2016 | Gousev et al. | |
| 2016/0227135 A1 | 8/2016 | Matolin et al. | |
| 2018/0191972 A1 | 7/2018 | Berner et al. | |
| 2018/0191982 A1 | 7/2018 | Berner et al. | |
| 2019/0051680 A1 | 2/2019 | Hanzawa et al. | |
| 2019/0260384 A1 | 8/2019 | Liobe et al. | |
| 2019/0285468 A1 | 9/2019 | Berkovich et al. | |
| 2019/0340452 A1 | 11/2019 | Asayama et al. | |
| 2020/0014418 A1 | 1/2020 | Yu et al. | |
| 2020/0068149 A1 | 2/2020 | Finateu et al. | |
| 2020/0084403 A1 | 3/2020 | Suh et al. | |

FOREIGN PATENT DOCUMENTS

| | | | |
|---|---|---|---|
| FR | 2976918 A1 | 12/2012 | |
| JP | 8-122149 A | 5/1996 | |
| JP | 2009508085 A | 12/2006 | |
| JP | 2009111666 A | 5/2009 | |
| JP | 2010-510732 A | 4/2010 | |
| JP | 2012015923 A | 1/2012 | |
| JP | 2015-501936 A | 1/2015 | |
| JP | 2015170863 A | 9/2015 | |
| JP | 2016-533140 A | 10/2016 | |
| JP | 2017046259 A | 3/2017 | |
| JP | 2018501675 A | 1/2018 | |
| JP | 2018067776 A | 4/2018 | |
| JP | 2019536389 A | 12/2019 | |
| JP | 2020016654 A | 1/2020 | |
| JP | 2020507974 A | 3/2020 | |
| KR | 2020/0029328 A | 3/2020 | |
| WO | 2017/158483 A1 | 9/2014 | |
| WO | 2014/174498 A1 | 10/2014 | |
| WO | 2015/036592 A1 | 3/2015 | |
| WO | 2017/009944 A1 | 1/2017 | |
| WO | 2017150240 A1 | 9/2017 | |
| WO | 2017/174579 A1 | 10/2017 | |
| WO | 2018/122800 A1 | 7/2018 | |
| WO | 2020/080383 A1 | 4/2020 | |
| WO | 2020110537 A1 | 6/2020 | |
| WO | 2020/229980 A1 | 11/2020 | |
| WO | 2020/0229981 A1 | 11/2020 | |
| WO | 2021/017766 A1 | 2/2021 | |

OTHER PUBLICATIONS

J. Guo et al., 2008, Sensors, 2008 IEEE.

Lichtsteiner et al., 2008, IEEE Journal of Solid-State Circuits, vol. 43, No. 2, Feb. 2008.

Chou et al., 2012, Sensors, 2012 IEEE.

S.D. Freedman, 2015, 2nd International Conference on Knowledge-Based Engineering and Innovation (KBEI).

M. Goto et al., 2016, 2016 IEEE SOI-3D-Subthreshold Microelectronics Technology Unified Conference.

Tobi Delbruck "Frame-Free Dynamic Digital Vision" Proceedings of the International Conf. on Secure-Life Electronics, Advanced Electroncis for Quality Life and Society, Mar. 7, 2008, pp. 21-26.

Christian Reckleben, Karsten Hansen, Senior Member, IEEE, Pradeep Kalavakuru, Janusz Szymanski, Florian Erdinger, Peter Fischer, Manfred Kirchgessner, and Jan Soldat; A 64-by-64 Pixel-ADC Matrix; 2015 IEEE.

Suarez et al. 2010; In-Pixel ADC for a Vision Architecture on CMOS-3D Technology.

Yu M. Chi, Student Member, IEEE, Udayan Mallik, Matthew A. Clapp, Edward Choi, Gert Cauwenberghs, Senior Member, IEEE, and Ralph Etienne-Cummings, Member, IEEE; IEEE Journal of Solid-State Circuits, vol. 42, No. 10, Oct. 2007; CMOS Camera With In-Pixel Temporal Change Detection and ADC.

Itoh et. al, "4-Layer 3-D IC with a function of parallel signal processing", Microelectronic engineering, vol. 15, No. 1-4, 1991, pp. 187-190.

Christian Brandli, StudentMember, IEEE, Raphael Berner, Member, IEEE, MinhaoYang, Student Member, IEEE, Shih-Chii Liu, Senior Member, IEEE, and Tobi Delbruck, Fellow, IEEE; A 240 33 180 130 dB 3 μS Latency Global Shutter Spatiotemporal Vision Sensor; IEEE Journal of Solid-State Circuits, vol. 49, No. 10, Oct. 2014.

Gallego et al.: "Event-based Vision: A Survey", IEEE Transactions on Pattern Analysis and Machine Intelligence, 2020, arXiv:1904.08405v3.

Biyin et al., "An In-Pixel Gain Amplifier Based Event-Driven Physical Unclonalbe Function for CMOS Dynamic" 2019 IEEE International Symposium on Circuits and Systems (ISCAS), IEEE, May 26, 2019, pp. 1-5.

Background Subtraction: Theory and Practice, Ahmed Elgammal, ISBN 1627054405; Copyright 2015.

Pending claims from U.S. Appl. No. 18/002,780—Preliminary Amendment; Pending as of Mar. 20, 2023.

Pending claims from U.S. Appl. No. 18/002,792—Preliminary Amendment; Pending as of Mar. 20, 2023.

Pending claims from U.S. Appl. No. 18/002,798—Preliminary Amendment; Pending as of Mar. 20, 2023.

Pending claims from U.S. Appl. No. 18/002,876—Preliminary Amendment; Pending as of Mar. 20, 2023.

Pending claims from U.S. Appl. No. 18/003,011—Preliminary Amendment; Pending as of Mar. 20, 2023.

Extended European Search Report for International Patent Application No. PCT/EP2020/061391 (dated Aug. 2, 2019).

European Office Action for European Patent Application No. 19 171 222.3 (dated Jul. 22, 2021).

Lichtsteiner et al., "A 128×128 120 dB 15 us Latency Asynchronous Temporal Contrast Vision Sensor," IEEE Journal of Solid State Circuits, 43(2):566-76 (2008).

Brandli et al., "A 240×180 dB 3 us Latency Global Shutter Spatiotemporal Vision Sensor," IEEE Journal of Solid State Circuits, 49(10):2333-41 (2014).

* cited by examiner

DELTA VISION SENSOR

REFERENCE TO RELATED APPLICATION

This application is a U.S. National Stage filing of International Application PCT/EP2020/061391, filed Apr. 23, 2020, which claims benefit of priority of European Patent Application Number 19171222.3, filed on Apr. 25, 2019, each of which is hereby incorporated by reference herein in its entirety.

FIELD OF INVENTION

The present invention relates to an image sensor and a method of operating an image sensor. In particular, the present invention relates to a delta vision sensor and a respective method.

BACKGROUND ART

In a conventional video camera, an array of photosensitive elements (i.e. an array of pixels) enables capturing of images at a given frame rate. Newer video standards support 8 megapixels, 33 megapixels, etc. and frame rates of 120 frames per second (fps), 240 fps, 300 fps, etc., thereby generating video streams of relatively high data rates. In many scenes, for example when capturing a video stream of a tennis game, the differences between consecutive frames may only be relatively small, for example the difference may relate only to a displacement of a moving racket or of a flying tennis ball, while the reminder of the scene, such as the tennis field, may remain essentially unchanged. Thus, because of the parts of the scene which remain unchanged, the video stream may comprise highly redundant data. Processing of the video stream may require highly powerful video processing devices, for example in order to determine the trajectory of a flying tennis ball with respect to the tennis field.

A delta vision sensor transmits pixel level changes only at the time they occur, thereby providing a low latency event stream having a low bandwidth. With respect to a conventional camera, the amount of data to be processed is reduced. Processing of the event stream may be enabled by less powerful processing devices than required in case of a conventional video stream.

U.S. Pat. No. 7,728,269 discloses a photoarray which includes an array of cells. Each cell has a photosensor generating a sensor signal dependent on a light intensity at the cell. A first capacitor is charged by a time-derivate of a current. A threshold detector detects if a voltage over the first capacitor exceeds a threshold value and generates an output signal if it does. A discharge device discharges the first capacitor after occurrence of the output signal. The cell generates only an event when the incoming light intensity changes, which reduces the amount of data to be processed.

U.S. Pat. No. 9,961,291 discloses a pixel acquisition circuit, an image sensor, and an image acquisition system. The pixel acquisition circuit comprises a photodetection unit, a filter-amplifier unit, a sample and hold unit, and an activation control unit. The photodetection unit is operative to output a first electrical signal corresponding to the light signal illuminating thereon in real time. The filter-amplifier unit has its input terminal coupled with the output terminal of the photodetector, and is operative to perform amplification and filtering out the signal component below a frequency threshold on the first electrical signal, so as to output a second electrical signal. A threshold comparison unit is operative to determine whether the second electrical signal is greater than a first threshold and/or less than a second threshold, and generate an activation instruction signal when the second electrical signal is greater than the first threshold or less than the second threshold. The sample and hold unit has its output terminal coupled with an interface bus. In response to receiving an activation instruction signal, the activation control unit instructs the sample and hold unit to acquire and buffer the first electrical signal, and sends a transmission request to the interface bus.

US20160227135 discloses a pixel circuit comprising a front-end circuit, a transient detector circuit, and an exposure measurement circuit. The front-end circuit comprises a photodiode and is configured to deliver a photoreceptor signal derived from a light exposure of the photodiode. The transient detector circuit is configured to detect a change in the photoreceptor signal. The exposure measurement circuit is configured for measuring the photoreceptor signal upon detection by the transient detector circuit of a change in the photoreceptor signal.

WO 2015/036592 discloses a dynamic single photodiode pixel circuit.

Patrick Lichtsteiner et al. disclose a 128×128 120 dB 15 µs Latency Asynchronous Temporal Contrast Vision Sensor.

Christian Brandli et al. disclose a 240×180 130 dB 3 µs Latency Global Shutter Spatiotemporal Vision Sensor.

DISCLOSURE OF THE INVENTION

There may be a need for an improved image sensor and a method of operating an image sensor. In particular, there may be a need for an improved delta vision sensor. In particular, there may be a need of an image sensor having an improved offset residue in the signal path. In particular, there may be a need of an image sensor having reduced requirements as regards the implementation of a capacitor, specifically having reduced requirements as regards e.g. linearity, parasitic effects to ground, etc. enabling that a CMOS capacitor can be used having a higher density than a metal capacitor used in the prior art. In particular, there may be a need of an image sensor having a reduced drift rate. In particular there may be a need for an image sensor having a reduced number of comparators. In particular there may be a need for an image sensor having improved pixel density.

Such a need may be met with the subject-matter of the independent claims. Advantageous embodiments are defined in the dependent claims.

Ideas underlying embodiments of the present invention may be interpreted as being based, inter alia, on the following observations and recognitions.

An aspect of the invention relates to an image sensor comprising an arrangement of pixels, the pixels including an acquisition circuit each, the acquisition circuit including: a sensor circuit configured to generate a sensor signal depending on a light signal illuminating a photosensor of the pixel; a storage circuit configured to store during a storage interval a stored signal proportional to the sensor signal; and a comparator circuit configured to generate after the refresh interval a comparator signal depending on the sensor signal and the stored signal.

A further aspect of the invention relates to an image sensor comprising an arrangement of pixels, the pixels including an acquisition circuit each, the acquisition circuit including: a sensor circuit configured to generate a sensor signal depending on a light signal illuminating a photosensor of the pixel; a storage circuit configured to store during a storage interval a stored signal proportional to the sensor signal; and a comparator circuit configured to generate after a refresh interval a comparator signal depending on the sensor signal and the stored signal. The storage circuit includes at least one amplifier, and the comparator circuit includes the same at least one amplifier, and the sensor signal is connected to an input of the at least one amplifier and wherein the other input of the at least one amplifier is connected via a capacitor to ground, substrate, or other common potential.

Various embodiments may preferably implement the following features.

In some embodiment, the storage interval is a reset interval or a refresh interval. Storing a stored signal proportional to the sensor signal during a storage interval and comparing the sensor signal with the stored signal after the storage interval enables to provide a delta vision sensor.

In some embodiments of the image sensor, the stored signal is connected via a capacitor to ground, substrate, or other common potential. The capacitor has reduced requirements as regards e.g. linearity, parasitic effects to ground, etc. and enables that a CMOS capacitor can be used having a higher density than a metal capacitor.

In some embodiments of the image sensor, the storage circuit includes at least one amplifier or high gain amplification stage, wherein an output of the at least one amplifier or high gain amplification stage provides the stored signal during the storage interval. The at least one amplifier or high gain amplification stage may be designed to provide for a particularly improved stored signal.

In some embodiments of the image sensor, the storage circuit includes a first amplifier and a second amplifier, wherein the first amplifier is connected to the sensor signal and the stored signal, wherein the second amplifier is connected to the output of the first amplifier and a hysteresis signal having a predetermined signal level during the storage interval, wherein a switch connects the output of the second amplifier to the stored signal during the storage interval, and wherein the switch disconnects the output of the second amplifier from the stored signal after the storage interval. The first amplifier, the second amplifier and the signal level of the hysteresis signal may be designed to provide for a particularly improved stored signal.

In some embodiments of the image sensor, the comparator circuit includes at least one amplifier or high gain amplification stage, wherein the comparator signal is generated after the storage interval additionally depending on a first offset signal during a first interval and depending on a second offset signal during a second interval. The at least one amplifier or high gain amplification stage may be designed to provide for a particularly improved stored signal.

In some embodiments of the image sensor, the comparator circuit includes a first amplifier and a second amplifier, wherein the first amplifier is connected to the sensor signal and the stored signal, wherein the second amplifier is connected to the output of the first amplifier and a hysteresis signal having after the storage interval a predetermined first offset signal during a first interval and a predetermined second offset signal during a second interval, and wherein the output of the second amplifier is connected to the comparator signal. The first amplifier, the second amplifier, the first offset signal and the second offset signal may be designed to provide for a particularly improved stored signal.

In some embodiments of the image sensor, the storage circuit includes at least one amplifier or high gain amplification stage, and the comparator circuit includes the same at least one amplifier or high gain amplification stage. The pixel density may be improved.

In some embodiments of the image sensor, the storage circuit includes a first amplifier and a second amplifier, and wherein the comparator circuit includes the same first amplifier and the same second amplifier. The pixel density may be improved.

In some embodiments of the image sensor, the acquisition circuit further includes a first 1 bit storage block connectable to the comparator signal during a first interval, and a second 1 bit storage block connectable to the comparator signal during a second interval.

In some embodiments of the image sensor, the acquisition circuit further includes a first signal line and a second signal line being associated with the first respectively the second 1 bit storage block, and being connected to source voltage or being floating depending on the bit stored in the respective 1 bit storage block, and depending on the state of a row line.

In some embodiments of the image sensor, the acquisition circuit further includes a signal line for refreshing the stored signal.

In some embodiments of the image sensor, the acquisition circuit further includes logic gates for refreshing the stored signal depending on a processing of the comparator signal.

In some embodiments of the image sensor, the acquisition circuit further includes a readout circuit for reading out the sensor signal.

In some embodiments of the image sensor, the image sensor is a metal oxide semiconductor.

In some embodiments, the capacitor is a high density capacitor, preferably a MOS capacitor or a poly-poly capacitor, wherein more preferably the capacitor has a bottomplate shorted to ground, substrate, or other common potential.

A further aspect of the invention relates to a method of operating an image sensor comprising an arrangement of pixels, the pixels including an acquisition circuit each, preferably according to an aspect as described above, the method comprising: generating a sensor signal depending on a light signal illuminating a photosensor of the pixel using a sensor circuit; storing a stored signal proportional to the sensor signal during a storage interval in a storage circuit; and generating after a refresh interval a comparator signal depending on the sensor signal and the stored signal using a comparator circuit.

A further aspect of the invention relates to a method of operating an image sensor comprising an arrangement of pixels, the pixels including an acquisition circuit each, preferably operating an image sensor according an aspect as described above, the method comprising: generating a sensor signal depending on a light signal illuminating a photosensor of the pixel using a sensor circuit; storing a stored signal proportional to the sensor signal during a storage interval in a storage circuit; and generating after a refresh interval a comparator signal depending on the sensor signal and the stored signal using a comparator circuit, wherein the storage circuit includes at least one amplifier, and the comparator circuit includes the same at least one amplifier, and wherein the sensor signal is connected to an input of the at least one amplifier and wherein the other input of the at least one amplifier is connected via a capacitor to ground, substrate, or other common potential.

Various embodiments may preferably implement the following features.

In some embodiments of the method, the storing comprises providing the stored signal during the storage interval at an output of the at least one amplifier.

In some embodiments of the method, the storage circuit includes a first amplifier and a second amplifier, wherein the first amplifier is connected to the sensor signal and the stored signal, wherein the method further comprises providing a hysteresis signal having a predetermined signal level during the storage interval and connecting the second amplifier to the output of the first amplifier and the hysteresis signal, and connecting the output of the second amplifier to the stored signal during the storage interval via a switch, and controlling the switch to disconnect the output of the second amplifier from the stored signal after the storage interval.

In some embodiments of the method, the comparator circuit includes at least one amplifier, wherein the method further comprises generating the comparator signal after the storage interval additionally depending on a first offset signal during a first interval and depending on a second offset signal during a second interval.

In some embodiments of the method, the comparator circuit includes a first amplifier and a second amplifier, wherein the method further comprises connecting the first amplifier to the sensor signal and the stored signal, and providing a hysteresis signal having after the storage interval a predetermined first offset signal during a first interval and a predetermined second offset signal during a second interval and connecting the second amplifier to the output of the first amplifier and to the hysteresis signal, and connecting the output of the second amplifier to the comparator signal.

In some embodiments of the method, the method further comprises connecting a first 1 bit storage block of the acquisition circuit to the comparator signal during a first interval, and connecting a second 1 bit storage block of the acquisition circuit to the comparator signal during a second interval.

In some embodiments of the method, the method further comprises associating a first signal line of the acquisition circuit and a second signal line of the acquisition circuit with the first respectively the second 1 bit storage block, and connecting the first and second signal line to source voltage or being floating depending on the bit stored in the respective 1 bit storage block, and depending on the state of a row line.

In some embodiments of the method, the method further comprises refreshing the stored signal with a signal line of the acquisition circuit.

In some embodiments of the method, the method further comprises refreshing the stored signal depending on a processing of the comparator signal via logic gates.

In some embodiments of the method, the acquisition circuit further includes a readout circuit, wherein the method further comprises reading out a diode signal related to the sensor signal via the readout circuit.

BRIEF DESCRIPTION OF THE DRAWINGS

In the following, advantageous embodiments of the invention will be described with reference to the enclosed drawings. However, neither the drawings nor the description shall be interpreted as limiting the invention.

FIG. 2ca is a first implementation of a voltage bias block;

FIG. 2cb is a second implementation of a voltage bias block;

The figures are only schematic. Same reference signs may refer to same or similar features.

MODE(S) FOR CARRYING OUT THE INVENTION

Figure 1:
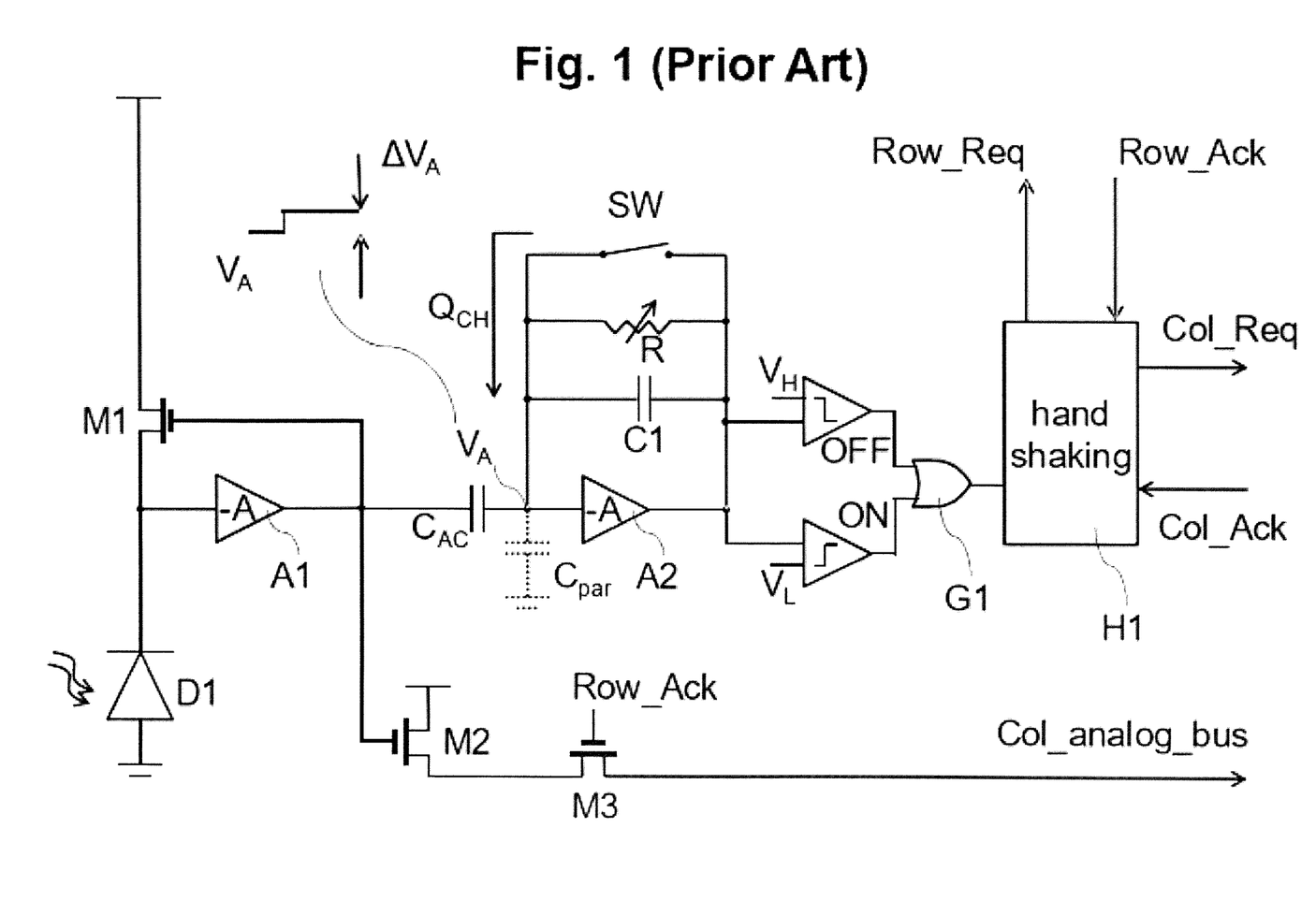
FIG. 1 is a schematic block diagram of a single cell of an image sensor according to the prior art.

FIG. 1 is a schematic block diagram of a single cell of an image sensor according to the prior art, e.g. as disclosed in U.S. Pat. No. 9,961,291. U.S. Pat. No. 7,728,269 enables the same functionality. The cell includes a photodiode D1, a first amplifier stage including amplifier A1, a second amplifier stage including amplifier A2, a threshold detecting stage with thresholds VH, VL, a hand shaking stage with request lines Row_Req, Col_Req and acknowledgement lines Row_Ack, Col_Ack, and an analog bus line Col_analog_bus. The first amplifier stage with amplifier A1 provides a voltage which is related to the incoming light intensity at photodiode D1. The voltage related to the light intensity at photodiode D1 is fed to the second amplifier stage with amplifier A2. The second amplifier stage with amplifier A2 includes a switched capacitor amplifier including capacitor CAC and capacitor C1. The output of the second amplifier stage with amplifier A2 is connected to the threshold stage, which provides OFF and ON signals according to a comparison of the output with thresholds VH and VL. The OFF and ON signals are fed to logic gate G1, which output is fed to the handshaking stage H1 with request/acknowledgment lines Row_Req, Col_Req, Row_Ack, Col_Ack. The analog bus line Col_analog_bus is connected via transistors M2, M3 to one end of capacitor CAC. Operation of the circuit according to FIG. 1 is described in detail in U.S. Pat. No. 9,961,291. U.S. Pat. No. 7,728,269 enables the same functionality. Operation of the circuit includes changing the state of switch SW of the second amplifier stage. Advantageously the ratio CAC/C1 is set to be fairly high, e.g. CAC/C1=10.

As will be explained further below, the cell according to FIG. 1 has several disadvantages. One disadvantage relates to the offset residue in the signal path. Another disadvantage relates to the requirements as regards the implementation of capacitor CAC, namely the requirements that the implementation enables for adequate linearity and little parasitic effects. A further disadvantage relates to the drift rate when switch SW is open. Yet a further disadvantage is that the threshold stage includes two comparators.

Note that the term amplifier in the following description of the present invention applies generally to mean a high gain amplification stage. As will be shown later, the present invention is insensitive to the actual gain of this high gain stage and therefore tolerant to variation in manufacture and operating conditions (voltage supply, temperature).

Figures 2, 2C:
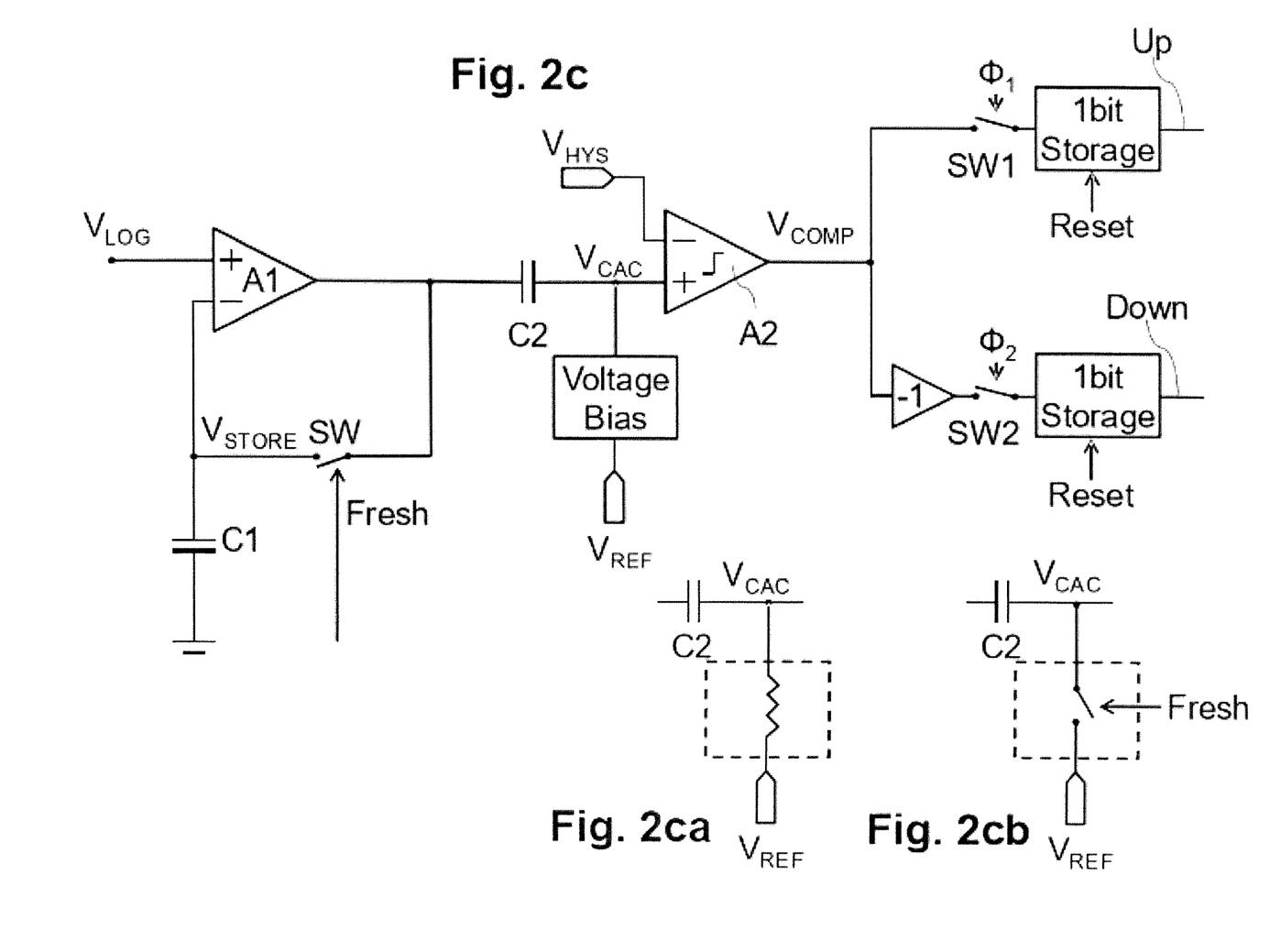
FIG. 2c is an alternative structure of a storage circuit and a comparator circuit in accordance to some embodiments of the present invention.
Figure 2A:
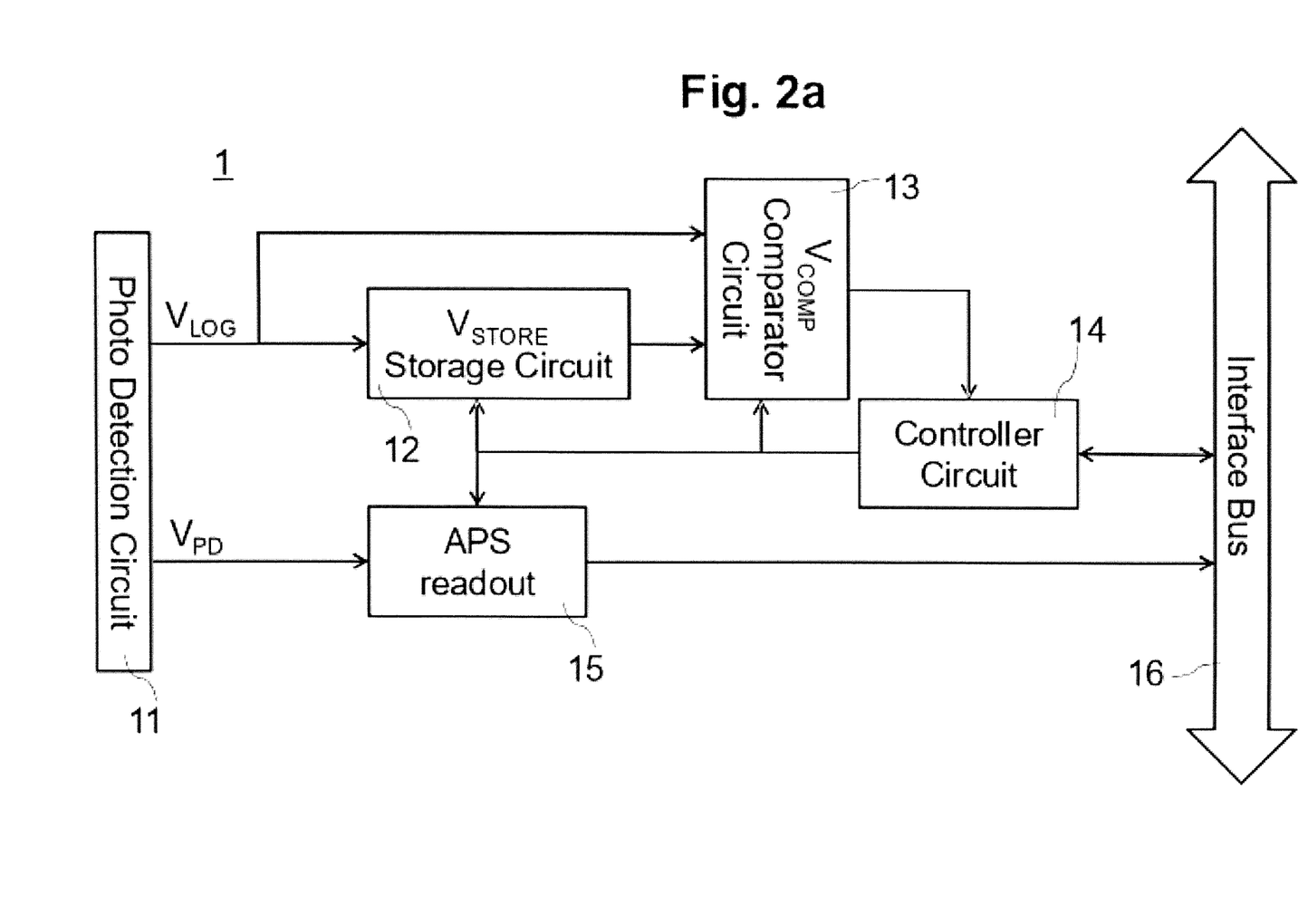
FIG. 2a is a schematic block diagram of an acquisition circuit of a pixel of an image sensor in accordance to some embodiments of the present invention.

FIG. 2a is a schematic block diagram of an acquisition circuit 1 of a pixel of an image sensor in accordance to some embodiments of the present invention. A photo detection circuit 11 provides for a sensor signal VLOG and a diode signal VPD which depend on the light intensity received at a photo sensor of the pixel. The sensor signal VLOG is received in a storage circuit 12 in order to store stored signal VSTORE, in particular during a refresh interval. The sensor signal VLOG and the stored signal VSTORE is received in a comparator circuit 13 in order to generate a comparator signal VCOMP depending on the sensor signal VLOG and the stored signal VSTORE, in particular after the refresh interval. The comparator signal VCOMP is received in a controller circuit 14, which interacts with interface bus 16 and controls storage circuit 12, comparator circuit 13 and APS readout 15 (APS: active pixel sensor). APS readout 15 receives diode signal VPD and provides an output to interface bus 16, in particular after the refresh interval.

Figure 2B:
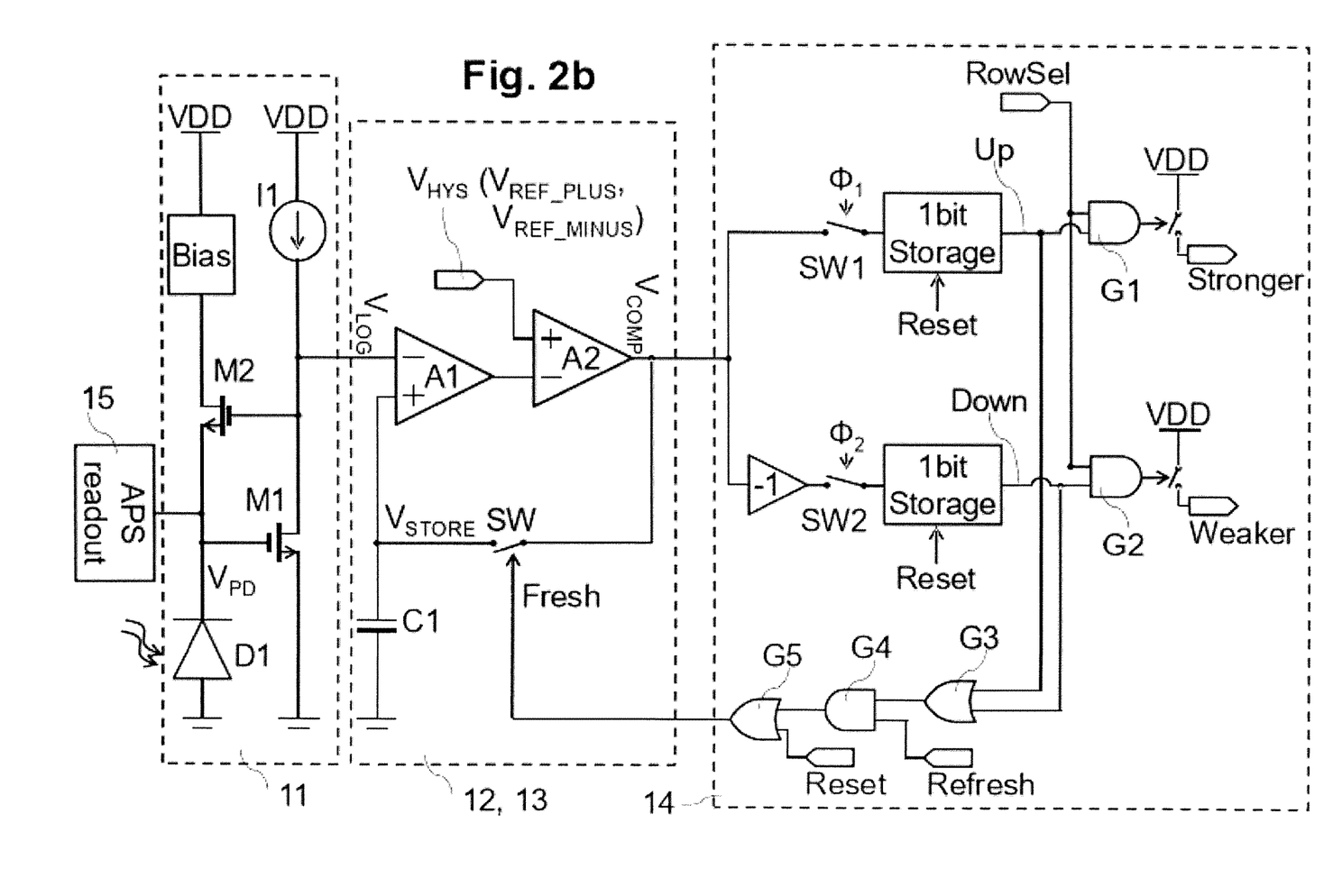
FIG. 2b is a schematic block diagram of an acquisition circuit of a pixel of an image sensor in accordance to some embodiments of the present invention.

FIG. 2b is a schematic block diagram of an acquisition circuit 1 of a pixel of an image sensor in accordance to some embodiments of the present invention. The anode of photodiode D1 is connected to ground. The cathode of photodiode D1 is connected to source of transistor M2 and to gate of transistor M1. The cathode of photodiode D1 provides diode signal VPD. Source of transistor M1 is connected to ground. Drain of transistor M1 is connected to gate of transistor M2, to the inverting input of a first amplifier A1 and via current source 11 to source voltage VDD. The inverting input of first amplifier A1 receives sensor signal VLOG. The diode current ID1 through photodiode D1 depends on the light intensity at photodiode D1. The diode current ID1 and the sensor signal VLOG have a logarithmic relation. APS readout block 15 (APS: Active Pixel Sensor) is connected to diode signal VPD.

In this disclosure, it is referred to the inverting and non-inverting input of amplifiers, respectively. The inverting input and the non-inverting input may, however, also be referred to "one input" and "another input" or "first input" and "second input" as they are interchangeable and may be connected in either way according to some examples of the present disclosure.

As soon as an operational amplifier is involved into the sampling, it implies the definition of "active". When the feedback is connected to the inverting input or the equivalent inverting input, it implies the implementation of "negative feedback".

The method comprises the following steps:
Step 1. Sense the signal at a certain time and store it into C1,
Step 2. Sense the input continuously, amplify the difference and compare it to a given threshold,
Step 3. In the event of a state change, store the event in a memory and report (output) the status.

As indicated in FIG. 2b, photodiode D1, transistors M1, M2 and current source 11 belong to the photo detection circuit 11 of FIG. 2a.

The examples and embodiments of the present disclosure are described using the term "ground" as a reference potential. However, the present disclosure also encompasses using a different common potential than ground or a substrate. The terms "ground", "substrate" and "(other) common potential" may thus be used interchangeably.

The sensor signal VLOG is connected to the inverting input of first amplifier A1. The non-inverting input of first amplifier A1 is connected via capacitor C1 to ground, substrate, or other common potential. Thus, one end of capacitor C1 is connected to the non-inverting input of first amplifier A1, while the other end of capacitor C1 is connected to ground. As will be further explained below, the end of capacitor C1 connected to the non-inverting input of first amplifier A1 has stored signal VSTORE.

The output of first amplifier A1 is connected to the inverting input of a second amplifier A2. The non-inverting input of second amplifier A2 is connected to signal line VHYS, which will be further described below. The output of second amplifier A2 is connected via switch SW to the end of capacitor C1 which is connected to the non-inverting input of first amplifier A1. Switch SW is controlled by signal line Fresh, which will be further described below. The output of second amplifier A2 has comparator signal VCOMP.

As indicated in FIG. 2b, amplifiers A1, A2, switch SW and capacitor C1 belong both to the storage circuit 12 (during the refresh interval) and the comparator circuit 13 (after the refresh interval) of FIG. 2a.

The comparator signal VCOMP is connected to switch SW1 and via an inverter to switch SW2. Switch SW1 is controlled by signal line ϕ1A and switch SW2 is controlled by signal line ϕ2. Signals ϕ1, ϕ2 will be further described below. The other ends of switches SW1, SW2 are each connected to a respective 1 bit storage block. The 1 bit storage blocks are each controlled by control signal line Reset, which will be further described below. The output of 1 bit storage block connected to switch SW1 provides the signal line Up. The output of 1 bit storage block connected to switch SW2 provides the signal line Down. The signal line Up is connected to one input of logic gate G1. The signal line Down is connected to one input of logic gate G2. The signal line RowSel is connected to another input of each of the logic gates G1, G2. The logic gates G1, G2 control switches which are arranged between source voltage VDD and a signal line providing a signal Stronger respectively a signal line providing a signal Weaker.

The logic gates G1, G2, as well as the further logic gates G3, G4, G5 explained below are illustrated in the figures using a function symbol. Different implementations are available for these logic gates.

As indicated in FIG. 2b, switches SW1, SW2, 1 bit storages blocks, gates G1, G2, G3, G4, G5 belong to the controller circuit 14 of FIG. 2a.

The signal line Up is further connected to one input of logic gate G3. The signal line Down is further connected to another input of logic gate G3. The output of logic gate G3 is connected to one input of logic gate G4. Another input of logic gate G4 is connected to a signal line Refresh, which will be further described below. The output of logic gate G4 is connected to an input of logic gate G5. Another input of logic gate G5 is connected to signal line Reset, which already has been mentioned. The output of logic gate G5 provides the signal line Fresh, which already has been mentioned, for controlling switch SW. Logic gates G1, G2, G4 are AND gates providing the logic AND function, while logic gates G3, G5 are OR gates providing the logic OR functions.

FIG. 2c illustrates schematically an alternative structure of a storage circuit 12 and a comparator circuit 13. As illustrated in FIG. 2c, the sensor signal VLOG is connected to the non-inverting input of first amplifier A1. The inverting input of first amplifier A1 is connected via first capacitor C1 to ground. The output of first amplifier A1 is connected via switch SW to the end of first capacitor C1 which is connected to the inverting input of first amplifier A1. The switch SW is controlled by the signal Fresh. The output of first amplifier A1 is further connected via second capacitor C2 to the non-inverting input of second amplifier A2. As indicated in FIG. 2c, second amplifier A2 is configured as a comparator. The inverting input of second amplifier A2 is connected to the signal line VHYS. The output of second amplifier A2 has comparator signal VCOMP, which is connected to the 1 bit storage blocks as described in connection with FIG. 2b. As illustrated in FIG. 2c, a voltage bias block is connected to the end of second capacitor C2 which is connected to the non-inverting input of second amplifier A2. Voltage bias block receives the reference signal VREF. Voltage bias block defines the DC voltage of the VCAC node, which is connected to the end of second capacitor C2 connected to the non-inverting input of second amplifier A2. FIG. 2ca illustrates a first implementation of the voltage bias block on the basis of a large resistor connected between the reference signal VREF and the VCAC node. FIG. 2cb illustrates a second implementation of the voltage bias block on the basis of a switch connected between the reference signal VREF and the VCAC node and controlled by the signal Fresh.

Figure 2D:
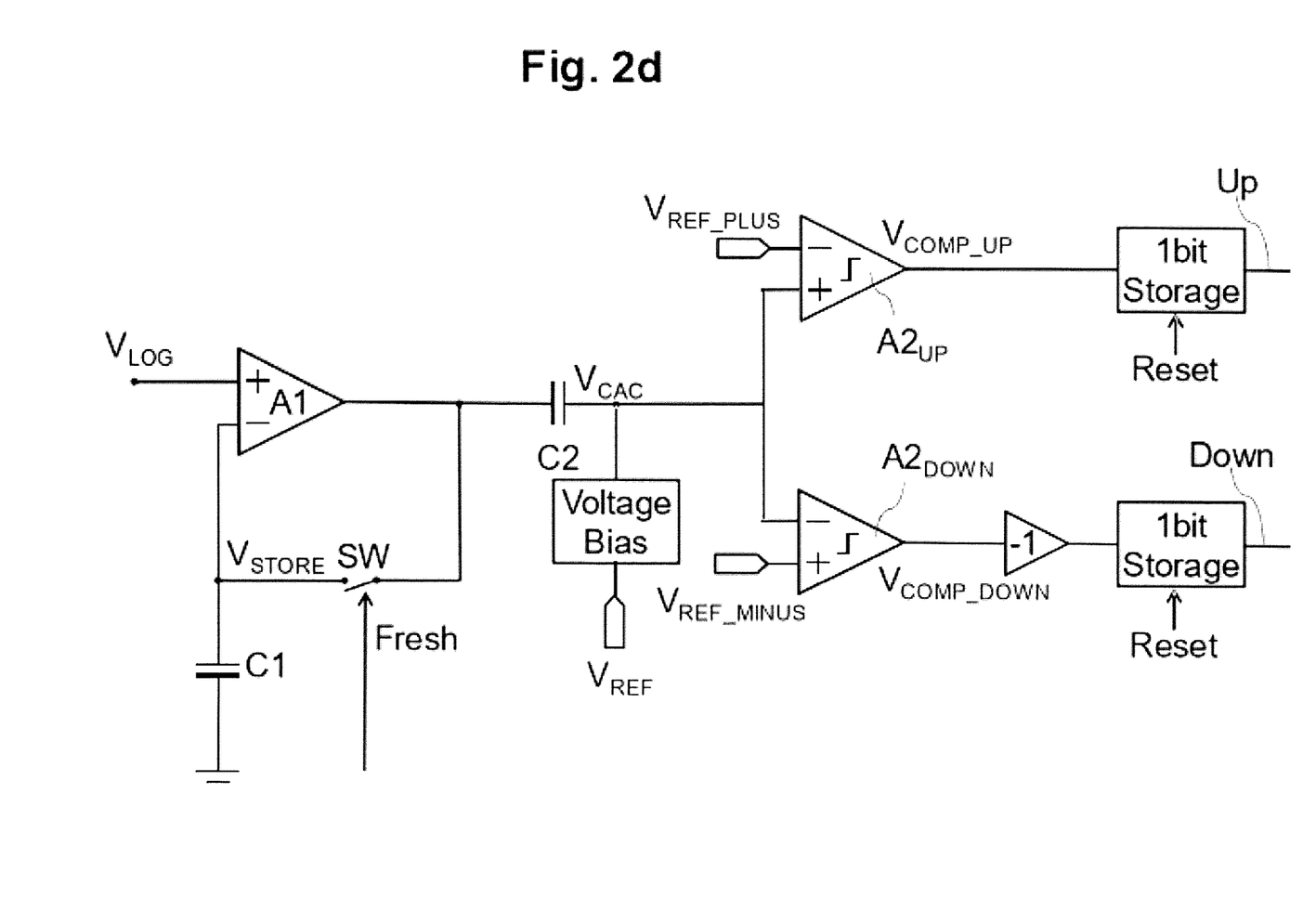
FIG. 2d is a further alternative structure of a storage circuit and a comparator circuit in accordance to some embodiments of the present invention.

FIG. 2d illustrates schematically a further alternative structure a storage circuit 12 and a comparator circuit 13. From sensor signal VLOG until VCAC node, the structure according to FIG. 2d equals the structure of FIG. 2c. As illustrated in FIG. 2d, VCAC node is connected to the non-inverting input of UP second amplifier A2UP and to the inverting input of DOWN second amplifier A2DOWN. As illustrated in FIG. 2d, the UP second amplifier A2UP and the DOWN second amplifier A2DOWN are configured as comparators. The inverting input of UP second amplifier A2UP is connected to reference signal VREF_PLUS. The non-inverting input of DOWN second amplifier A2DOWN is connected to reference signal VREF_MINUS. The output of UP second amplifier A2UP provides the signal VCOMP_UP, which is connected to 1 bit storage block. The output of DOWN second amplifier A2DOWN provides the signal VCOMP_DOWN, which is inverted and connected to 1 bit storage block.

The structures according to FIG. 2c and FIG. 2d have the advantage to have an additional high pass filter compared to the structure according to FIG. 2b without a second capacitor C2.

Figure 3:
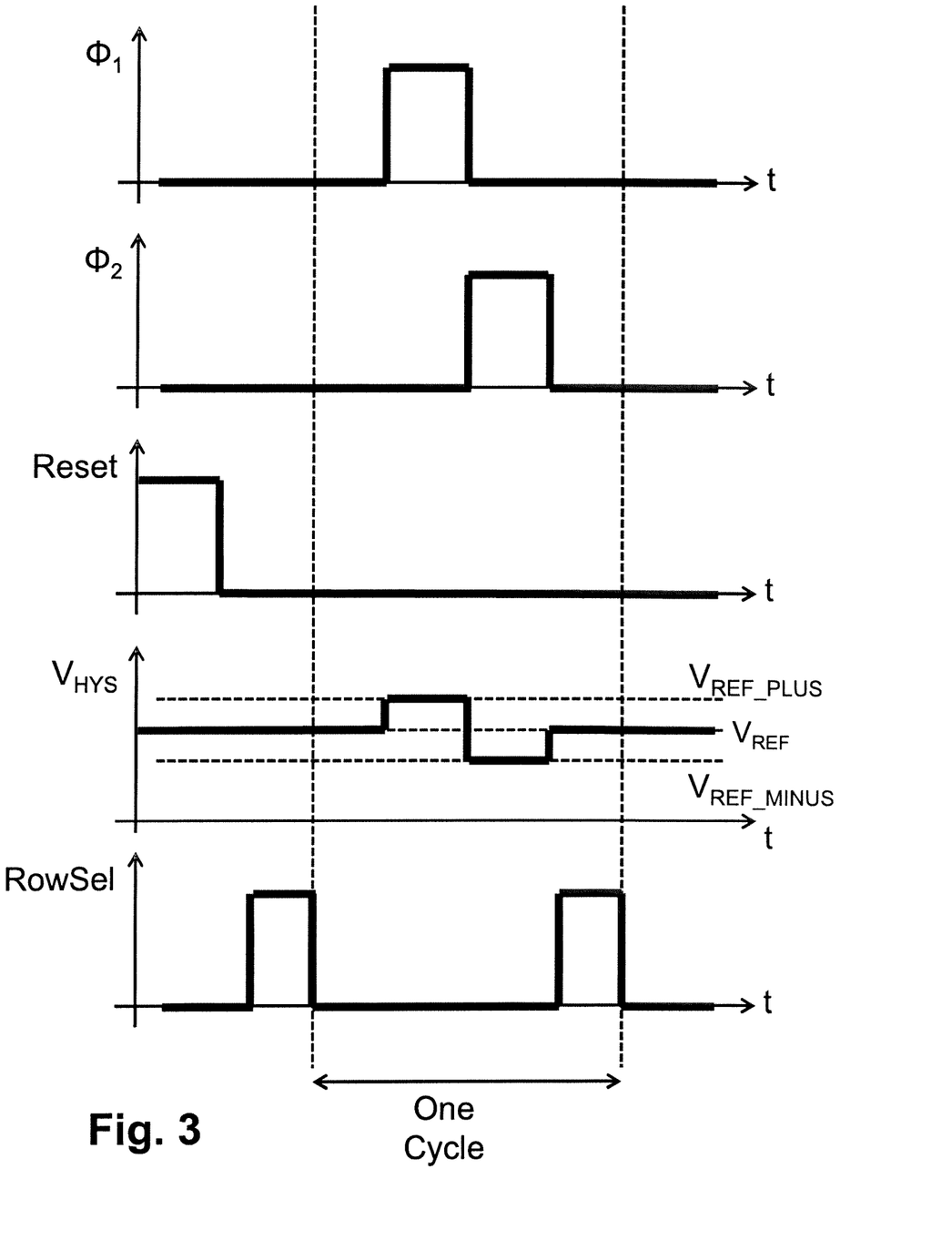
FIG. 3 is a schematic time diagram of signals of an acquisition circuit of a pixel of an image sensor in accordance to some embodiments of the present invention.

FIG. 3 is a schematic time diagram of signals of an acquisition circuit 1 of a pixel of an image sensor in accordance to some embodiments of the present invention. FIG. 3 includes the schematic time diagram of the signals on signal lines φ1, φ2 for controlling the switches SW1, SW2. FIG. 3 includes the schematic time diagram of the signal on signal line Reset. Reset occurs periodically with a predefined frequency, e.g. 1 Hz. The reset is shared with all pixels. That means the reset signal will reset all the pixels. FIG. 3 includes the schematic time diagram of the signal on signal line VHYS, which is connected to the non-inverting input of second amplifier A2. FIG. 3 includes the schematic time diagram of the signal on signal line RowSel, which is connected to respective inputs of logic gates G1, G2. The signals φ1, φ2, Reset, and RowSel change between a low state and a high state for controlling respective switches or logic gates. The signal VHYS changes between signal levels VREF, VREF_PLUS, and VREF_MINUS. As indicated in FIG. 3, the transition of the signal RowSel from the high state to the low state defines the beginning and the end of one cycle.

In the following, the working principle of the image sensor according to some embodiments of the present invention is explained with reference to FIG. 2b and FIG. 3.

In the reset mode, VHYS is set to VREF. All pixels share the same Reset. When Reset has a high state, the switch SW receives a logic 1 signal and SW is closed. The signal at the output of second amplifier becomes VCOMP=VSTORE=VLOG-offset. The VLOG-offset is stored in capacitor C1.

In the auto-zeroing mode, namely during a refresh interval, VHYS is set to VREF. When the signal Refresh has a high state, if neither Up nor Down signal has a high state, the switch SW receives a logic 0 signal and there is no refresh. When the signal Refresh has a high state, if either Up or Down signal has a high state, the switch SW receives a logic 1 signal and SW is closed. The signal at the output of second amplifier becomes VCOMP=VSTORE=VLOG-offset. The offset includes both systematic offset (due to the finite gain of the A1 and A2) and the random offset (due to the mismatch of the elements inside the A1 and A2). The VLOG-offset is stored in capacitor C1. As indicated in FIG. 2b, the 1 bit storage blocks are set to logic 0.

As indicated in FIG. 3, the signal Refresh changes to low state. Accordingly, the switch SW opens. First and second amplifiers A1, A2 work now as a comparator. VCOMP at the output of second amplifier depends on VSTORE, VLOG and VHYS. VSTORE is the signal stored in capacitor C1 during Refresh. VLOG relates to changes in the light intensity at photodiode D1.

In φ1 mode, namely during a first interval, VHYS is set in accordance to the time diagram illustrated in FIG. 3 to VREF_PLUS and signal φ1 is set to a high state. The difference between VREF and VREF_PLUS is the hysteresis. In accordance to signal φ1, switch SW1 is closed. VCOMP indicates if the signal increase of VLOG is higher or lower than VSTORE+(VREF_PLUS−VREF)/A1. For example, VCOMP becomes to logic "1" if the signal increase is higher than (VREF_PLUS−VREF)/A1, and VCOMP becomes to logic "0" otherwise. The result is stored in 1 bit storage block connected to switch SW1, i.e. a logic "1" is stored if the signal increase of VLOG is higher than (VREF_PLUS−VREF)/A1, and a logic "0" is stored if the signal increase of VLOG is lower than (VREF_PLUS−VREF)/A1.

In φ2 mode, namely during a first interval, VHYS is set in accordance to the time diagram illustrated in FIG. 3 to VREF_MINUS and signal φ2 is set to a high state. The difference between VREF and VREF_MINUS is the hysteresis. In accordance to signal φ2, switch SW2 is closed. VCOMP indicates if the signal decrease of VLOG is higher or lower than VSTORE+(VREF−VREF_MINUS)/A1. For example, VCOMP becomes to logic "0" if the signal decrease of VLOG is higher than VSTORE+(VREF−VREF_MINUS)/A1, and VCOMP becomes logic "1" otherwise. The result is inverted and is stored in 1 bit storage block connected to switch SW2, i.e. a logic "1" is stored if the signal decrease of VLOG is higher than VSTORE+(VREF−VREF_MINUS)/A1, and a logic "0" is stored if the signal increase of VLOG is lower than VSTORE+(VREF−VREF_MINUS)/A1.

In order to read out the pixel, the signal line RowSel is set to a high state, as indicated in FIG. 3. As illustrated in FIG. 2b, the signal line RowSel forms one input to the logic gates G1, G2, while each output of the 1 bit storage blocks forms another input to the respective logic gates G1, G2. Depending on the data in the 1 bit storage blocks, the signal line Stronger and the signal line Weaker are either pulled up to source voltage VDD or have high impedance (i.e. have floating output). By applying a current between the signal line Stronger respectively the signal line Weaker and ground, either a logic "1" or a logic "0" can be read out from the pixel. Because the signal line Stronger respectively the signal line Weaker is at high impedance (rather than generating a logic "0"), a single signal line is sufficient for reading for reading the Stronger signal respectively the Weaker signal of pixels arranged in columns and rows.

During read out of the pixel, if one (or both, which is not expected and should be very rare) of the signal Up and the signal Down has a high state, a high state is generated on the signal line Refresh, which has been mentioned above, in order to close the switch SW controlled by the signal line Fresh. Accordingly, VCOMP=VSTORE=VLOG−offset, which results from the current light intensity at photodiode D1, is stored on capacitor C1 for a next detection of changes in the light intensity at photodiode D1.

Figure 4:
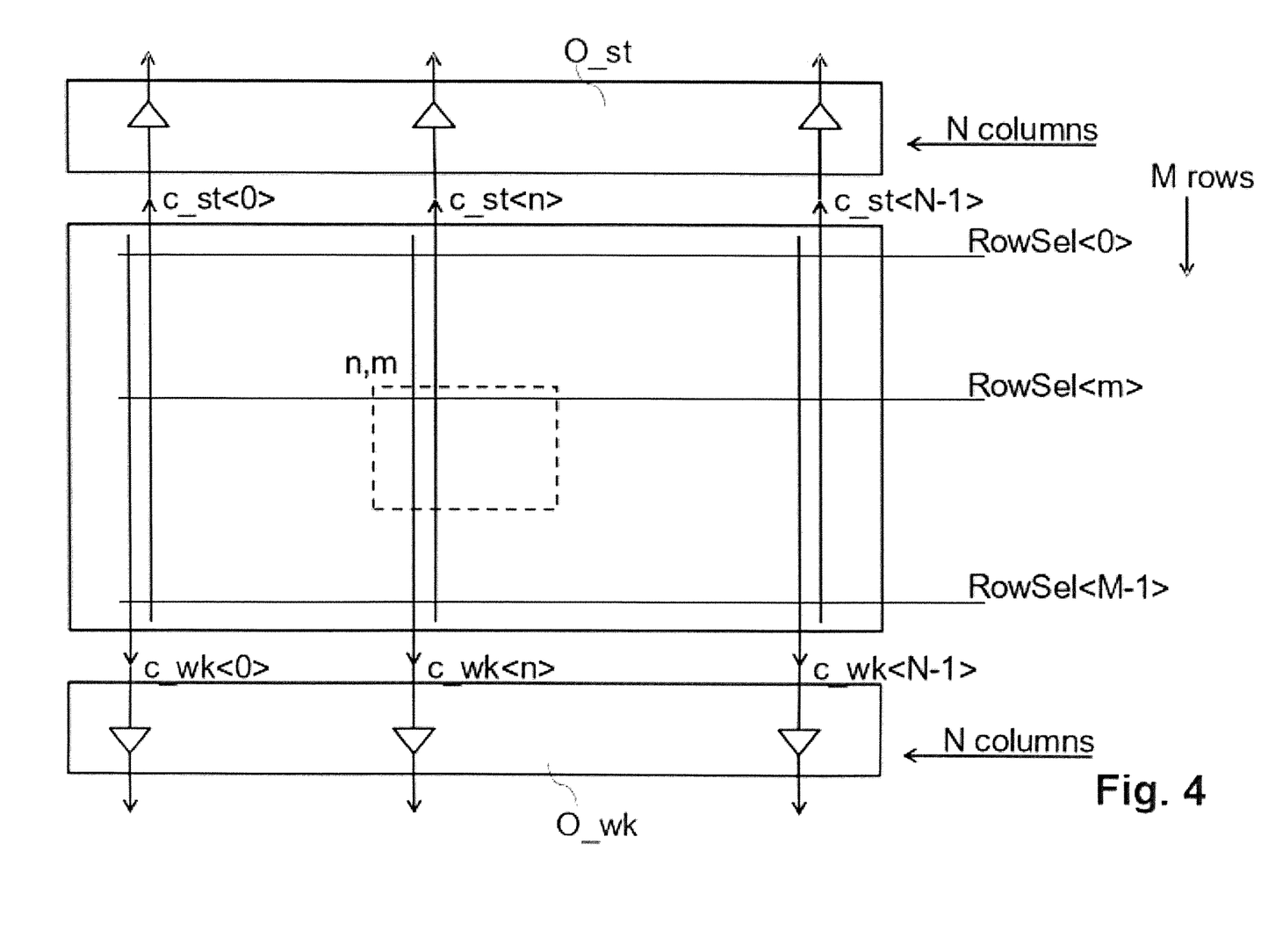
FIG. 4 is a schematic block diagram of a plurality of pixels of an image sensor in accordance to some embodiments of the present invention.

FIG. 4 is a schematic block diagram of a plurality of pixels of an image sensor in accordance to some embodiments of the present invention. The pixels are arranged in an array of N columns and M rows. Pixels of a particular row share a single line RowSel<m>, where m indicates the row number and is between 0 and M−1. Pixels in the same column share a single line c_st<n> related to the Stronger signal and a single line c_wk<n> related to the Weaker signal, where n indicates the column number and is between 0 and N−1. As illustrated in FIG. 4, the lines c_st< . . . > related to the Stronger signals are connected to readout circuit block O_st and the lines c_wk< . . . > related to the Weaker signals are connected to readout circuit block O_wk. The readout circuit blocks O_st, O_wk will be further explained below in connection with FIG. 6.

Figure 5:
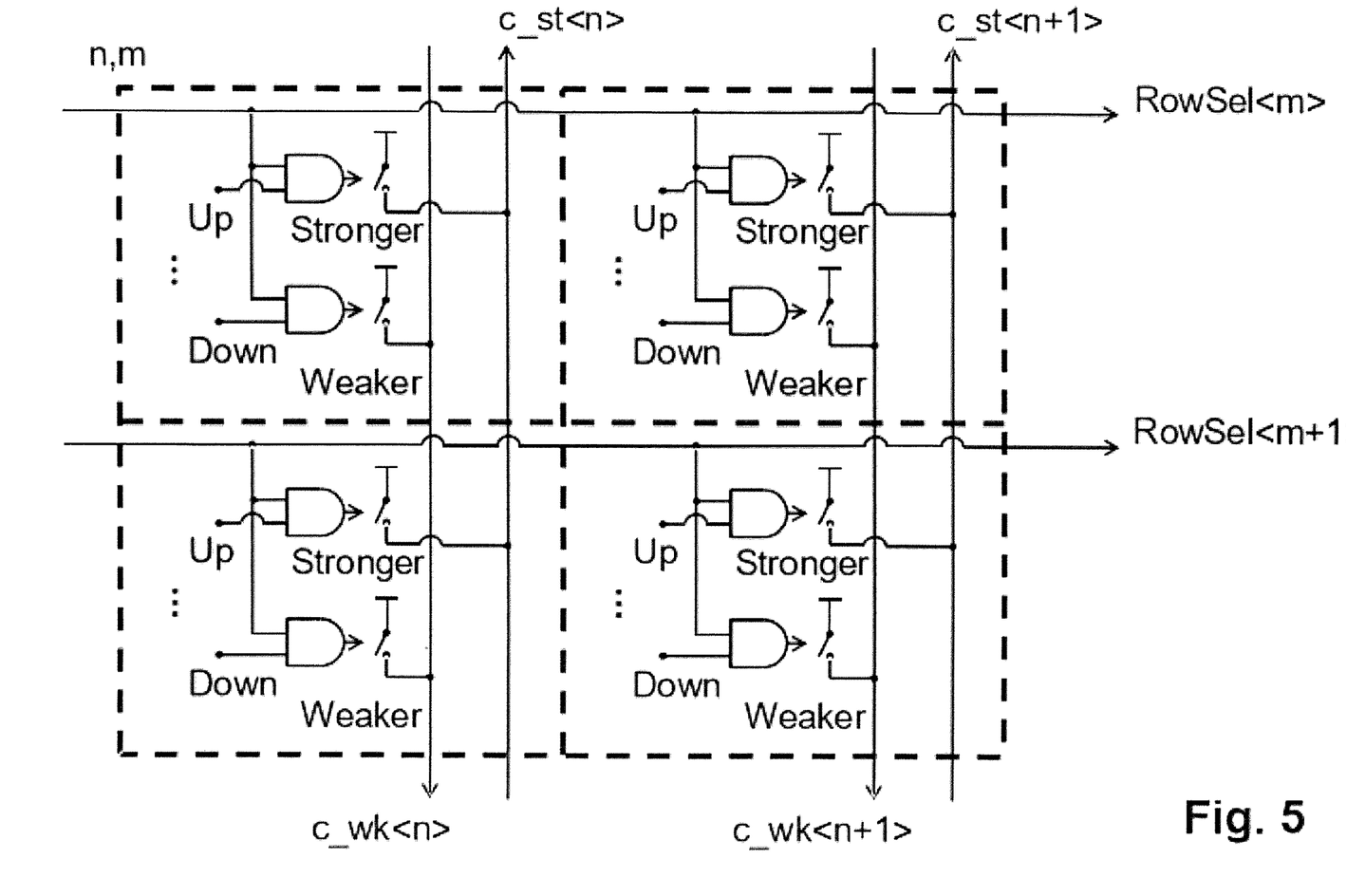
FIG. 5 is a schematic block diagram of four pixels arranged at a particular location of an image sensor in accordance to some embodiments of the present invention.

FIG. 5 is a schematic block diagram of four pixels arranged at a particular location of an image sensor in accordance to some embodiments of the present invention. As illustrated in FIG. 4, a particular arrangement of pixels is arranged at position m,n. FIG. 5 illustrates an arrangement of four pixels located at position m,n. The signal lines Stronger and the signal lines Weaker of the pixels, which were described above in connection with FIG. 2*b* for a single pixel, are connected to the column lines c_st<n,n+1> respectively the column lines c_wk<n,n+1>. The signal lines RowSel<m,m+1> are connected to the respective inputs of the logic gates arranged in the pixels, as described above in connection with FIG. 2*b* for a single pixel. If a particular signal line RowSel<m> is selected, depending on the change in illumination of the respective pixel, the column lines c_wk< . . . > are either pulled up to source voltage VDD or are at high impedance (floating).

Figure 6:
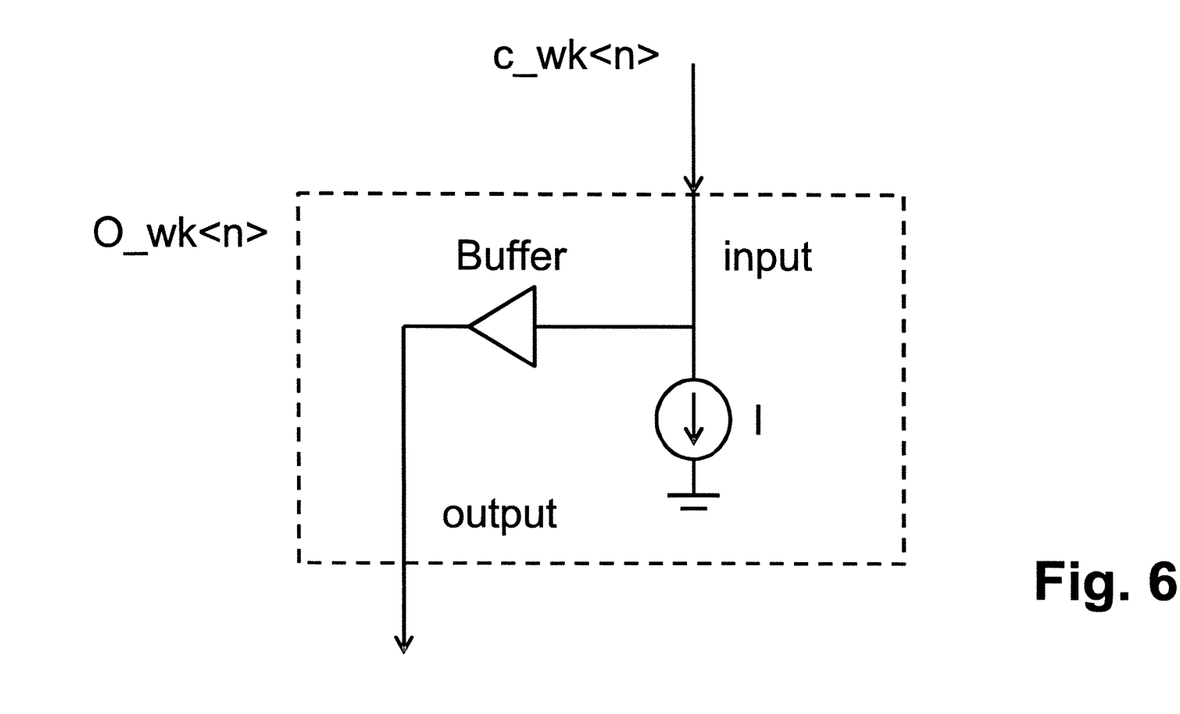
FIG. 6 is a schematic block diagram of a readout circuit of a pixel of an image sensor in accordance to some embodiments of the present invention.

FIG. 6 is a schematic block diagram of a readout circuit of a pixel of an image sensor in accordance to some embodiments of the present invention. FIG. 6 illustrates a readout circuit O_wk<n>, namely a particular one of the N readout circuits of readout circuit block O_wk. The column line c_wk<n> is connected to current source I, which in turn is connected to ground. The column line c_wk<n> is further connected to buffer Buffer, which provides the output signal. If c_wk<n> is pulled up to source voltage VDD, the output signal is at high state, e.g. "1". If c_wk<n> is at high impedance (floating), c_wk<n> is pulled to ground and the output signal is at low state, e.g. "0". The readout circuits of readout circuit block O_st have a respective structure.

As mentioned above, the pixel according to the present invention has several advantages.

A first advantage concerns offset. In the prior art, with reference to FIG. 1, the offset residue, or the input referred offset in the signal path is $VOS=(VOS\_Amp)/(1+A)+Vch$, where VOS is the total input referred offset, VOS_Amp is the input referred offset of the amplifier, A is the amplifier gain and Vch is the charge injection error caused by switch SW when it changes its state. As indicated in FIG. 1, parasitic capacitance Cpar is included between the input of the amplifier and ground. Parasitic capacitance Cpar is designed to be minimized considering the gain, because CAC and Cpar form a capacitive divider, which has the effect that a bigger Cpar results in a bigger attenuation of VA. As illustrated in FIG. 1, $\Delta VA=Vch=QCH/Cpar$, where QCH is the injected charge when switch SW changes its state. Thus, Vch can be large.

According to the present invention, the input-referred offset is reduced by two means providing much better performance than the prior art. First, a high gain amplification stage with gain A1, or a two-stage amplifier is arranged having a higher total gain $A=A1$ or $A=A1*A2$. The total input referred offset is therefore reduced by the high gain of amplifier A1 or the gain enhancement of the second stage A2. As a result, the present invention is insensitive to both the offset and gain of the amplifiers. Second, the capacitor C1 illustrated in FIG. 1, which is arranged between the sensitive node VA and ground, substrate, or other common potential, can be designed as a large, high density capacitor (e.g. MOS capacitor, poly-poly capacitor), thereby reducing the offset caused by charge injection QCH and extending the dynamic range.

A second advantage concerns area. In the prior art, the AC coupling topology according to FIG. 1 requires small parasitic (which causes signal attenuation) and high voltage independence (which reduces the linearity of signal path) for both CAC and C1. Thus the metal-metal capacitor is chosen for CAC and C1 implementation.

According to the present invention, the capacitor is grounded or connected to substrate or another common potential, and a high density capacitor (e.g. MOS capacitor, poly-poly capacitor) can be used because the bottom-plate capacitor is shorted to ground, substrate, or other common potential. Compared to a metal-metal capacitor, a high density capacitor such as a MOS capacitor, poly-poly capacitor, etc. has a higher density and the required area for the pixel can be significantly reduced.

For example, the image sensor of FIG. 1 according to the prior art requires a metal capacitor which has a capacitance density of maximally 3 fF/um2, wherein the capacitor requires about 25% of the total area of the pixel. According to the present invention, a high density capacitor may be used having a capacitance density of about 6-7 fF/um2, which results in a pixel size which is reduced by about 12.5%.

A third advantage concerns drift. In the prior art, with reference to FIG. 1, when switch SW is open, the voltage VA drifts with time due to leakage, e.g. the leakage of switch SW and the leakage at the input of amplifier A.

According to the present invention, VSTORE also drifts due to similar reasons. However, capacitor C1 as illustrated in FIG. 2*b* is by a factor of for example two or three larger than the capacitor CAC illustrated in FIG. 1, while using the same area. According to the invention, the drift rate is therefore less serious. This enables a reduced refresh rate, with the advantage that slower changes in light intensity at the pixel can be detected.

A fourth advantage concerns the comparator devices. According to the prior art, with reference to FIG. 1, two comparators are required (comparators labeled with ON and OFF in FIG. 1). Each of the comparators requires a specific area and power. The comparators work in parallel in order to distinguish whether there was a change in light intensity (ON=1/OFF=0 or ON=0/OFF=1) or whether there was no change in light intensity (ON=0 and OFF=0). The mismatch of the comparators must be calibrated, or the difference between VH and VL (see FIG. 1) must be large enough to mask the mismatch. The input referred (referring to A1 output) difference of VH and VL is (VH−VL)*C1/CAC. Due to the technology and area limitation, the ratio between C1 and CAC is not large. If the A1 output change is less than (VH−VL)*C1/CAC, it will not be detected. A large difference between VH and VL results in a reduced detection sensitivity.

According to the present invention, only one comparator is required. Accordingly, less area is required. Moreover, the comparator generates the Up and Down signals (cf. FIG. 2b, FIG. 3) are generated using a small signal VHYS set either to VREF, VREF_PLUS or VREF_MINUS. In the auto-zeroing mode, VHYS=VREF. In the φ1 mode, VHYS=VREF_PLUS=VREF+ΔV. The ΔV is used as hysteresis. When the increase of VLOG is larger than ΔV/A1, the comparator outputs logic "1" and the signal Up is thus 1. Otherwise, the signal Up is 0. In the φ2 mode, VHYS=VREF_MINUS=VREF−ΔV. The ΔV is used as hysteresis. When the decrease of VLOG is larger than ΔV/A1, the comparator outputs logic "0" and inverted by inverter, thus the signal Down is 1. Otherwise the signal Down is 0. Accordingly, two phases in the signals for generating the Up and Down signals are required, which has the result that one cycle (cf. FIG. 3) requires more time. For most applications, the difference is in the micro-second range and therefore not important. However, the mismatch of the two comparators does not exist and ΔV can be as small as just for noise reasons.

Finally, it should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. An image sensor comprising an arrangement of pixels, each of the pixels including an acquisition circuit, the acquisition circuit including:
a sensor circuit configured to generate a sensor signal depending on a light signal illuminating a photosensor of the pixel;
a storage circuit configured to store during a storage interval a stored signal proportional to the sensor signal; and
a comparator circuit configured to generate, after the storage interval, a comparator signal depending on the sensor signal and the stored signal,
wherein the storage circuit includes at least one amplifier, and the comparator circuit includes the same at least one amplifier,
wherein the sensor signal is connected to an input of the at least one amplifier and wherein another input of the at least one amplifier is connected via a capacitor to ground, substrate, or other common potential,
wherein the at least one amplifier and the capacitor belong to the storage circuit during the storage interval and belong to the compactor circuit after the storage interval,
wherein the acquisition circuit further comprises a signal line for refreshing the stored signal during the storage interval, and
wherein an output of the at least one amplifier is connected via a switch to the capacitor, wherein the switch is controlled by the signal line.

2. The image sensor of claim 1, wherein the stored signal is connected via the capacitor to ground, substrate, or other common potential.

3. The image sensor of claim 1, wherein another output of the at least one amplifier or a high gain amplification stage provides the stored signal during the storage interval.

4. The image sensor of one of claim 1, wherein the storage circuit comprises a first amplifier of the at least one amplifier and a second amplifier of the at least one amplifier, wherein the first amplifier is connected to the sensor signal and the stored signal,
wherein the second amplifier is connected to the output of the first amplifier and a hysteresis signal having a predetermined signal level during the storage interval,
wherein a second switch connects the output of the second amplifier to the stored signal during the storage interval, and
wherein the second switch disconnects the output of the second amplifier from the stored signal after the storage interval.

5. The image sensor of claim 1,
wherein the comparator circuit is adapted to generate the comparator signal after the storage interval additionally depending on a first offset signal during a first interval and depending on a second offset signal during a second interval.

6. The image sensor of claim 1, wherein the comparator circuit includes a first amplifier of the at least one amplifier and a second amplifier of the at least one amplifier,
wherein the first amplifier is connected to the sensor signal and the stored signal,
wherein the second amplifier is adapted to be connected to an output of the first amplifier and a hysteresis signal having, after the storage interval, a predetermined first offset signal during a first interval and a predetermined second offset signal during a second interval, and
wherein an output of the second amplifier is connected to the comparator signal.

7. The image sensor of claim 1, wherein the storage circuit includes a first amplifier of the at least one amplifier and a second amplifier of the at least one amplifier, and
wherein the comparator circuit also includes the first amplifier and the second amplifier.

8. The image sensor of claim 1, wherein the acquisition circuit further includes a first 1-bit storage block connectable to the comparator signal during a first interval, and a second 1-bit storage block connectable to the comparator signal during a second interval.

9. The image sensor of claim 8, wherein the acquisition circuit further includes a first signal line and a second signal line being associated with the first 1-bit storage block and the second 1-bit storage block respectively, and adapted to be connected to source voltage or being floating depending on the bit stored in the respective 1-bit storage block, and depending on the state of a row line.

10. The image sensor of claim 1, wherein the acquisition circuit further includes logic gates configured to refresh the stored signal depending on a processing of the comparator signal.

11. The image sensor of claim 1, wherein the acquisition circuit further includes a readout circuit adapted to read out a diode signal related to the sensor signal.

12. The image sensor of claim 1, wherein the image sensor is a metal oxide semiconductor.

13. The image sensor of claim 1, wherein the capacitor is a high density capacitor.

14. A method of operating an image sensor comprising an arrangement of pixels, each of the pixels including an acquisition circuit, the method comprising:
generating a sensor signal depending on a light signal illuminating a photosensor of the pixel using a sensor circuit;
storing a stored signal proportional to the sensor signal during a storage interval in a storage circuit; and
generating, after a refresh interval, a comparator signal depending on the sensor signal and the stored signal using a comparator circuit,
wherein the storage circuit includes at least one amplifier, and the comparator circuit includes the same at least one amplifier,
wherein the sensor signal is connected to an input of the at least one amplifier and wherein another input of the at least one amplifier is connected via a capacitor to ground, substrate, or other common potential,
wherein the at least one amplifier and the capacitor belong to the storage circuit during the storage interval and belong to the compactor circuit after the storage interval,
wherein the acquisition circuit further comprises a signal line for refreshing the stored signal during the storage interval, and
wherein an output of the at least one amplifier is connected via a switch to the capacitor, wherein the switch is controlled by the signal line.

15. The method of claim 14, wherein the step of storing comprises providing the stored signal during the storage interval at an output of the at least one amplifier.

16. The method claim 14, wherein the storage circuit includes a first amplifier of the at least one amplifier and a second amplifier of the at least one amplifier, wherein the first amplifier is connected to the sensor signal and the stored signal,
wherein the method further comprises,
providing a hysteresis signal having a predetermined signal level during the storage interval, and
connecting the second amplifier to an output of the first amplifier and the hysteresis signal; and
connecting an output of the second amplifier to the stored signal during the storage interval via a switch; and
controlling the switch to disconnect the output of the second amplifier from the stored signal after the storage interval.

17. The method of claim 14,
wherein the method further comprises generating the comparator signal after the storage interval additionally depending on a first offset signal during a first interval and depending on a second offset signal during a second interval.

18. The method of one of claim 17, wherein the comparator circuit includes a first amplifier of the at least one amplifier and a second amplifier of the at least one amplifier,
wherein the method further comprises connecting the first amplifier to the sensor signal and the stored signal, and
providing a hysteresis signal having, after the storage interval, a predetermined first offset signal during a first interval and a predetermined second offset signal during a second interval and connecting the second amplifier to an output of the first amplifier and to the hysteresis signal, and
connecting an output of the second amplifier to the comparator signal.

19. The method of claim 14, further comprising connecting a first 1-bit storage block of the acquisition circuit to the comparator signal during a first interval, and
connecting a second 1-bit storage block of the acquisition circuit to the comparator signal during a second interval.

20. The method of claim 19, further comprising associating a first signal line of the acquisition circuit and a second signal line of the acquisition circuit with the first 1-bit storage block and the second 1-bit storage block, respectively;
connecting the first signal line to source voltage or floating the first signal line depending on the bit stored in the first 1-bit storage block, and depending on the state of a row line; and
connecting the second signal line to source voltage or floating the second signal line depending on the bit stored in the second 1-bit storage block and depending on the state of the row line.

21. The method of claim 14, further comprising refreshing the stored signal depending on a processing of the comparator signal via logic gates.

22. The method of claim 14, wherein the acquisition circuit further includes a readout circuit, and
wherein the method further comprises reading out a diode signal related to the sensor signal via the readout circuit.

23. The image sensor of claim 13, wherein the capacitor is a MOS capacitor or a poly-poly capacitor.

24. The image sensor of claim 13, wherein the capacitor has a bottom-plate shorted to ground, substrate, or other common potential.

* * * * *